(12) United States Patent
Yuan

(10) Patent No.: US 10,737,311 B1
(45) Date of Patent: Aug. 11, 2020

(54) INTEGRATED METHOD FOR FORMING AND PERFORMANCE CONTROL OF NIAL ALLOY THIN-WALLED TUBULAR PARTS

(71) Applicant: Dalian University of Technology, Dalian (CN)

(72) Inventor: Shijian Yuan, Dalian (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 16/520,555

(22) Filed: Jul. 24, 2019

(30) Foreign Application Priority Data

May 27, 2019 (CN) .......................... 2019 1 0444984

(51) Int. Cl.
| | |
|---|---|
| *B21D 33/00* | (2006.01) |
| *B21C 37/30* | (2006.01) |
| *C22C 21/00* | (2006.01) |
| *B21D 31/04* | (2006.01) |
| *B21C 37/08* | (2006.01) |

(52) U.S. Cl.
CPC .......... *B21D 33/00* (2013.01); *B21C 37/0818* (2013.01); *B21C 37/30* (2013.01); *B21D 31/04* (2013.01); *C22C 21/00* (2013.01)

(58) Field of Classification Search
CPC ........ B21D 33/00; B21D 31/04; B21C 37/00; B21C 37/0818; C22C 21/00
See application file for complete search history.

(56) References Cited

FOREIGN PATENT DOCUMENTS

| CN | 103057203 A | 4/2013 |
|---|---|---|
| CN | 106676330 A | 5/2017 |

*Primary Examiner* — Jessee R Roe
(74) *Attorney, Agent, or Firm* — Troutman Pepper Hamilton Sanders LLP; Christopher C. Close, Jr.

(57) ABSTRACT

The present invention provides an integrated method for forming and performance control of NiAl alloy thin-walled tubular parts. A Ni/Al laminated foil tube is obtained after Ni foils and Al foils are alternately laminated and coiled; and the Ni/Al laminated foil tube is subjected to plastic forming, reaction synthesis and densification treatment in a gas bulging forming die to obtain a NiAl alloy thin-walled tubular part. The present invention solves the problem in the prior art that the preparation of an existing NiAl alloy sheet and the formation of the thin-walled tubular part from the sheet feature difficulty in material flow and structural performance control and a complicated process. Data of embodiments shows that the NiAl alloy thin-walled tubular parts obtained by using the method of the present invention has a high forming rate, high dimensional precision, uniform composition distribution, good tubular part compactness and no defects on the surface.

12 Claims, 2 Drawing Sheets

INTEGRATED METHOD FOR FORMING AND PERFORMANCE CONTROL OF NIAL ALLOY THIN-WALLED TUBULAR PARTS

CROSS-REFERENCE TO RELATED APPLICATION

This application claims benefit of Chinese Application number 201910444894.6 filed May 27, 2019, entitled "INTEGRATED METHOD FOR FORMING AND PERFORMANCE CONTROL OF NIAL ALLOY THIN-WALLED TUBULAR PARTS."

TECHNICAL FIELD

The present invention relates to the technical field of precision forming of intermetallic compound thin-walled tubular parts, and in particular to an integrated method for forming and performance control of NiAl alloy thin-walled tubular parts.

BACKGROUND

A NiAl alloy has the advantages of high melting point, low density, high thermal conductivity, high structural stability, excellent oxidation resistance, and the like, so that the NiAl alloy is superior to conventional titanium alloy in the field of high temperature engineering and may fill the gap between a conventional high temperature alloy and a high temperature structural ceramic, and is a novel high temperature structural material with great potential. NiAl alloy tubular parts have good application prospects in the engineering field, and are mainly used in aero engines, air inlets and flame tubes of ultra-high-speed aerospace vehicles and other components. However, since the intrinsic brittleness of intermetallic compounds limits the use of such materials, conventional processing processes need to include forging, hot rolling, superplastic forming, and the like. The preparation of NiAl alloy tube blank is particularly difficult. The conventional processing method generally adopts isothermal rolling (or pack rolling) to prepare a NiAl alloy sheet, and after coiling, NiAl alloy welded tube blank is obtained through welding; or NiAl alloy tube blank is obtained through an extrusion process under high temperature. Then, thin-walled tubular parts are obtained by superplastic forming. A conventional preparation process is adopted, the process is complicated, the requirements for equipment are harsh, and the rate of finished products is low. Therefore, there is an urgent need to develop novel technologies for hot processing of intermetallic compounds.

Against this problem, researchers at home and abroad have proposed the following technical ideas. The patent with the publication No. CN106676330 A proposes a NiAl alloy and a preparation method thereof. The method uses Ni and Al powder to prepare a NiAl alloy by vacuum hot pressing or precision casting, and the method may be applied to preparation of a glass hot bending die. However, it is difficult to use the method to prepare NiAl alloy thin-walled members. The patent with the publication No. CN103057203 A proposes a layered NiAl material and a preparation method thereof. The method adopts an alternating lamination of Ni foils and Al foils to perform hot press compounding twice, and a NiAl alloy plate is obtained after heat treatment. However, the conventional method for preparing the NiAl alloy thin-walled tubular parts is still used, that is, a sheet is first prepared, the NiAl alloy welded tube is obtained, and a tubular part is finally obtained by superplastic forming. In addition, a tube coiling process is difficult, a tube welding process is complicated, a superplastic forming process has higher requirements on forming devices and material structures, the forming rate is lower, and superplastic forming defects of the thin-walled tubular parts are more, for example, voids are easily formed in the deformation process, resulting in material fracture.

SUMMARY

In view of the above, an objective of the present invention is to provide an integrated method for forming and performance control of NiAl alloy thin-walled tubular parts. In the method of the present invention, gas bulging forming, reaction synthesis, and densification treatment are all performed in a gas bulging forming die. The operation is simple, and the prepared thin-walled tubular parts have uniform composition distribution, good compactness and no defects on the surface.

To achieve the above purpose, the present invention provides the following technical solution.

An integrated method for forming and performance control of NiAl alloy thin-walled tubular parts includes the following steps:

(1) calculating the ratio of Ni foil thickness to Al foil thickness according to the ratio of the number of Ni atoms to the number of Al atoms in a NiAl alloy; and pretreating to-be-processed Ni foils and Al foils, to obtain pretreated Ni foils and pretreated Al foils;

(2) alternately stacking a plurality of the pretreated Ni foils and a plurality of the pretreated Al foils, to obtain a Ni/Al laminated foil; and coiling the Ni/Al laminated foil to obtain a Ni/Al laminated foil tube; and (3) performing gas bulging forming of the Ni/Al laminated foil tube, and after the Ni/Al laminated foil tube fully fits a gas bulging forming die, sequentially performing first reaction synthesis, second reaction synthesis and densification treatment to obtain NiAl alloy thin-walled tubular parts; where the first reaction synthesis is to heat the gas bulging forming die to 610-650° C., raise the gas pressure to 10-20 MPa, and maintain the temperature and pressure for 2-5 h; the second reaction synthesis is to heat the gas bulging forming die to 1000-1300° C., raise the gas pressure to 10-50 MPa, and maintain the temperature and pressure for 2-4 h; and the densification treatment is to heat the gas bulging forming die to 1000-1300° C., raise the gas pressure to 50-100 MPa, and maintain the temperature and pressure for 1-5 h.

Preferably, after the Ni/Al laminated foil is coiled, the method further includes welding a butt joint of the Ni/Al laminated foil.

Preferably, after the Ni/Al laminated foil tube is obtained, the method further includes inserting a metal shaft tube into the Ni/Al laminated foil tube, applying a boron nitride solder mask between the Ni/Al laminated foil tube and the metal shaft tube, integrally placing the Ni/Al laminated foil tube and the metal shaft tube in a cylindrical cavity die for expansion, integrally taking out the Ni/Al laminated foil tube and the metal shaft tube to take out the internal metal shaft tube, and executing step (3); where the expansion is performed at 300-500° C. under the gas pressure of 15-40 MPa for 0.1-5 h.

Preferably, the temperature of the gas bulging forming and the gas pressure are actually regulated according to the gas bulging forming conditions.

Preferably, the gas bulging forming is performed at room temperature.

Preferably, the gas bulging forming is performed at 400-600° C.

Preferably, the working surface of the gas bulging forming die is evenly coated with the boron nitride solder mask.

Preferably, gas for the gas bulging forming and gas for maintaining the gas pressure are each preferably an inert gas.

Preferably, the gas pressure of the second reaction synthesis is lower than that of the densification treatment.

Preferably, step (3) is replaced by: performing gas bulging forming of the Ni/Al laminated foil tube, and after the Ni/Al laminated foil tube fully fits a gas bulging forming die, heating the gas bulging forming die to 610-650° C., raising the gas pressure to 10-20 MPa, maintaining the temperature and pressure for 2-5 h to perform first reaction synthesis; sequentially performing second reaction synthesis and densification treatment in a hot isostatic pressing device to obtain NiAl alloy thin-walled tubular parts; where the second reaction synthesis is to maintain the temperature and pressure for 2-5 h under an inert atmosphere at 1000-1300° C. and under the gas pressure of 10-50 MPa, and the densification treatment is to maintain the temperature and pressure for 1-5 h under an inert atmosphere at 1000-1300° C. and under the gas pressure of 50-100 MPa.

The present invention provides an integrated method for forming and performance control of NiAl alloy thin-walled tubular parts, including the following steps: (1) calculating the ratio of Ni foil thickness to Al foil thickness according to the ratio of the number of Ni atoms to the number of Al atoms in a NiAl alloy, and calculating a thickness ratio of the Ni foil to the Al foil; pretreating to-be-processed Ni foils and Al foils, to obtain pretreated Ni foils and pretreated Al foils; (2) alternately stacking a plurality of the pretreated Ni foils and a plurality of the pretreated Al foils, to obtain a Ni/Al laminated foil; and coiling the Ni/Al laminated foil to obtain a Ni/Al laminated foil tube; (3) performing gas bulging forming of the Ni/Al laminated foil tube, and after the Ni/Al laminated foil tube fully fits a gas bulging forming die, sequentially performing first reaction synthesis, second reaction synthesis and densification treatment to obtain NiAl alloy thin-walled tubular parts; where the first reaction synthesis is to heat the gas bulging forming die to 610-650° C., raise the gas pressure to 10-20 MPa, and maintain the temperature and pressure for 2-5 h; the second reaction synthesis is to heat the gas bulging forming die to 1000-1300° C., raise the gas pressure to 10-50 MPa, and maintain the temperature and pressure for 2-4 h; and the densification treatment is to heat the gas bulging forming die to 1000-1300° C., raise the gas pressure to 50-100 MPa, and maintain the temperature and pressure for 1-5 h.

Beneficial Effects:

1. The present invention uses the Ni foil and the Al foil as raw materials, and the material specifications and composition are highly controllable; the wall thickness of the tubular part may be adjusted by the thickness and the number of layers of the original Ni foil and Al foil, the preparation process is safe and free of pollution, and the cost is low.

2. After the Ni foil and the Al foil are stacked, the gas bulging forming is directly performed, so that the plastic forming capability of the Ni foil and the Al foil may be exerted, and the use requirements on die steel are reduced.

3. The three steps of plastic forming, reaction synthesis and densification treatment are successively implemented in the same die, which may significantly improve the dimensional accuracy of NiAl alloy thin-walled tubular parts and improve production efficiency.

4. By controlling parameters of the first reaction synthesis and the second reaction synthesis in the gas bulging forming die, the NiAl alloy thin-walled tubular parts have good composition uniformity; the NiAl alloy thin-walled tubular parts have excellent structural compactness by controlling densification treatment parameters; and through the control of the above parameters, the NiAl alloy thin-walled tubular parts having excellent composition uniformity and structural compactness may be prepared in the shortest time.

DETAILED DESCRIPTION

Figure 1:
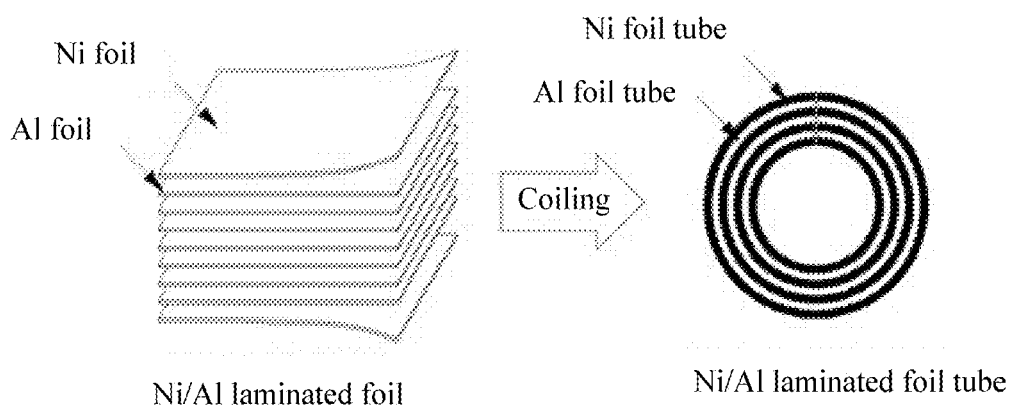
FIG. 1 is a schematic view showing a Ni/Al laminated foil tube made of a Ni/Al laminated foil in the present invention.

The present invention provides an integrated method for forming and performance control of NiAl alloy thin-walled tubular parts, including the following steps.

(1) Calculate the ratio of Ni foil thickness to Al foil thickness according to the ratio of the number of Ni atoms to the number of Al atoms in a NiAl alloy, and calculate a thickness ratio of the Ni foil to the Al foil; and pretreat to-be-processed Ni foils and Al foils, to obtain pretreated Ni foils and pretreated Al foils.

(2) Alternately stack a plurality of the pretreated Ni foils and a plurality of the pretreated Al foils, to obtain a Ni/Al laminated foil; and coil the Ni/Al laminated foil to obtain a Ni/Al laminated foil tube.

(3) Perform gas bulging forming of the Ni/Al laminated foil tube, and after the Ni/Al laminated foil tube fully fits a gas bulging forming die, sequentially perform first reaction synthesis, second reaction synthesis and densification treatment to obtain NiAl alloy thin-walled tubular parts; where the first reaction synthesis is to heat the gas bulging forming die to 610-650° C., raise the gas pressure to 10-20 MPa, and maintain the temperature and pressure for 2-5 h; the second reaction synthesis is to heat the gas bulging forming die to 1000-1300° C., raise the gas pressure to 10-50 MPa, and maintain the temperature and pressure for 2-4 h; and the densification treatment is to heat the gas bulging forming die to 1000-1300° C., raise the gas pressure to 50-100 MPa, and maintain the temperature and pressure for 1-5 h.

In the present invention, the ratio of Ni foil thickness to Al foil thickness is calculated according to the ratio of the number of Ni atoms to the number of Al atoms in the NiAl alloy, and the thickness ratio of the Ni foil to the Al foil is calculated; and the to-be-processed Ni foils and Al foils are pretreated, to obtain pretreated Ni foils and pretreated Al foils.

In the present invention, the ratio of the number of Ni atoms to the number of Al atoms in the NiAl alloy is preferably 1:1. In the present invention, a method of pretreating the Ni foil and the Al foil is not particularly limited, and a method for cleaning the Ni foil and the Al foil, which is well known to those skilled in the art, may be adopted. In a specific embodiment of the present invention, the method for pretreatment of the Ni foil and the Al foil preferably includes the steps of: polishing the Ni foil and the Al foil with fine sandpaper, placing the Ni foil and the Al foil in an acetone solution for ultrasonic cleaning, soaking the Ni foil and the Al foil in distilled water for 1 min, and after the Ni foil and the Al foil are finally ultrasonically washed in absolute ethanol, taking out the Ni foil and the Al foil and blowing the Ni foil and the Al foil dry by cold air.

After the pretreated Ni foils and the pretreated Al foils are obtained, in the present invention, the plurality of pretreated Ni foils and the plurality of pretreated Al foils are alternately stacked, to obtain a Ni/Al laminated foil; and the Ni/Al laminated foil is coiled to obtain a Ni/Al laminated foil tube.

In the present invention, the number of layers of the pretreated Ni foil and the pretreated Al foil is not particularly limited, and those skilled in the art may set the number according to the thickness of the to-be-prepared thin-walled tubular part and the thicknesses of the Ni foil and the Al foil.

In the present invention, a method for coiling the Ni/Al laminated foil is not particularly limited, as long as the Ni/Al laminated foil may form into a tubular shape. In the present invention, a schematic view of forming a Ni/Al laminated foil tube from a Ni/Al laminated foil through coiling is shown in FIG. 1.

In the present invention, after the Ni/Al laminated foil is coiled, preferably the method further includes welding a butt joint of the Ni/Al laminated foil. In the present invention, a method and material for the welding are not specifically limited, and a method for welding the Ni foil and the Al foil, which is well known to those skilled in the art, may be adopted. In the present invention, the butt joint of the Ni/Al laminated foil is welded to ensure the interlayer stacking stability between the Ni foil and the Al foil layer, and to ensure the gas sealing property in the Ni/Al laminated foil tube during the gas bulging forming.

After the Ni/Al laminated foil tube is obtained, preferably the present invention further includes inserting a metal shaft tube into the Ni/Al laminated foil tube, applying a boron nitride solder mask between the Ni/Al laminated foil tube and the metal shaft tube, integrally placing the Ni/Al laminated foil tube and the metal shaft tube in a cylindrical cavity die for expansion, integrally taking out the Ni/Al laminated foil tube and the metal shaft tube to take out the internal metal shaft tube, and performing follow-up gas bulging forming and first reaction synthesis and the like; where the expansion is performed at 300-500° C. under the gas pressure of 15-40 MPa for 0.1-5 h.

In the present invention, the thickness of the metal shaft tube is preferably 0.2-2 mm. In the present invention, the coating thickness of the boron nitride solder mask is preferably 50-100 m. In the specific embodiment of the present invention, the coating thickness of the boron nitride solder mask is specifically set according to the size of a to-be-prepared tubular part. In the present invention, a method for coating of the boron nitride solder mask is not specifically limited, as long as the boron nitride solder mask may be applied between the Ni/Al laminated foil tube and the metal shaft tube. In the present invention, the metal shaft tube is inserted into the Ni/Al laminated foil tube to ensure interlayer material consistency between the Ni foil and the Al foil which are stacked, and to ensure butt joint of the Ni/Al laminated foil is welded to ensure the gas sealing property in the Ni/Al laminated foil tube.

After the Ni/Al laminated foil tube is obtained, in the present invention, the gas bulging forming of the Ni/Al laminated foil tube is performed, and after the Ni/Al laminated foil tube fully fits a gas bulging forming die, first reaction synthesis, second reaction synthesis and densification treatment are sequentially performed to obtain NiAl alloy thin-walled tubular parts; where the first reaction synthesis is to heat the gas bulging forming die to 610-650° C., raise the gas pressure to 10-20 MPa, and maintain the temperature and pressure for 2-5 h; the second reaction synthesis is to heat the gas bulging forming die to 1000-1300° C., raise the gas pressure to 10-50 MPa, and maintain the temperature and pressure for 2-4 h; and the densification treatment is to heat the gas bulging forming die to 1000-1300° C., raise the gas pressure to 50-100 MPa, and maintain the temperature and pressure for 1-5 h.

In the present invention, the temperature of the gas bulging forming and the gas pressure are actually regulated according to the gas bulging forming conditions. In a specific embodiment of the present invention, the gas bulging forming temperature is preferably room temperature or 400-600° C.; when the gas bulging forming temperature is room temperature, an interlayer low oxidation state between the Ni foils and the Al foils which are stacked is maintained easily; when the gas bulging forming temperature is 400-600° C., the forming capacity of the Ni foils and the Al foils which are stacked may be improved, and a member with a complicated shape is prepared easily.

In the present invention, the working surface of the gas bulging forming die is coated with the boron nitride solder mask. In the present invention, the coating thickness of the boron nitride solder mask is preferably 50-100 m. In the present invention, the method for coating of the boron nitride solder mask is not specifically limited, as long as the working surface of the gas bulging forming die may be coated with the boron nitride solder mask. According to the present invention, the working surface of the gas bulging forming die is coated with the boron nitride solder mask, which may prevent the Ni/Al laminated foil tube from being combined with the gas bulging forming die at high temperature to ensure the performance of the final thin-walled tubular part.

In the present invention, gas for the gas bulging forming and gas for maintaining the gas pressure are each preferably an inert gas; and the inert gas preferably includes argon or helium.

In the present invention, the first reaction synthesis is to heat the gas bulging forming die to 610-650° C., preferably 620-640° C., more preferably 630° C.; to raise the gas pressure to 10-20 MPa, preferably 12-18 MPa, further preferably 14-16 MPa; and to maintain the temperature and pressure for 2-5 h, preferably 3-4 h.

In the present invention, the specific reaction of the first reaction synthesis is:

$$Ni+3Al \rightarrow NiAl_3 + \Delta H_1;$$

$$NiAl_3 + Ni \rightarrow Ni_2Al_3 + \Delta H_2.$$

In the present invention, in the first reaction synthesis process, in the first reaction synthesis process, Ni and Al in the original Ni/Al laminated foil tube are subjected to reaction synthesis, to form NiAl₃ at the interface between the Ni foil and the Al foil. NiAl₃ is then subjected to reaction synthesis with Ni to form Ni₂Al₃; and finally, the Al reaction is completed to form Ni/Ni₂Al₃/Ni laminated structure.

In the present invention, the second reaction synthesis is to heat the gas bulging forming die to 1000-1300° C., preferably 1050-1250° C., more preferably 1100-1200° C.; to raise the gas pressure to 10-50 MPa, preferably 20-40 MPa, further preferably 30 MPa; and to maintain the temperature and pressure for 2-4 h, preferably 3-4 h.

In the present invention, the specific reaction of the second reaction synthesis is:

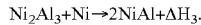

Ni₂Al₃+Ni→2NiAl+ΔH₃.

In the present invention, the Ni₂Al₃ formed by the second reaction synthesis is reacted with Ni at a high temperature to obtain uniform NiAl.

In the present invention, the densification treatment is to heat the gas bulging forming die to 1000-1300° C., preferably 1050-1250° C., further preferably 1100-1200° C.; to raise the gas pressure to 50-100 MPa, preferably 60-90 MPa, further preferably 70-80 MPa; and to maintain the temperature and pressure for 1-5 h, preferably 2-4 h, and further preferably 3 h. In the present invention, the gas pressure of the densification treatment is preferably greater than that of the second reaction synthesis; and the temperature of the densification treatment is preferably greater than that of the second reaction synthesis. In the present invention, the densification treatment in the gas forming and bulging forming process may effectively prevent from reducing the dimensional accuracy when transferring a thin-walled member; at the same time, processes may be reduced, and the production efficiency may be effectively improved; in addition, the densification treatment is performed in the gas bulging forming die, which, for large-sized thin-walled members, may effectively reduce the use requirements (furnace chamber size limitation) on a heat treatment furnace.

Figure 2:
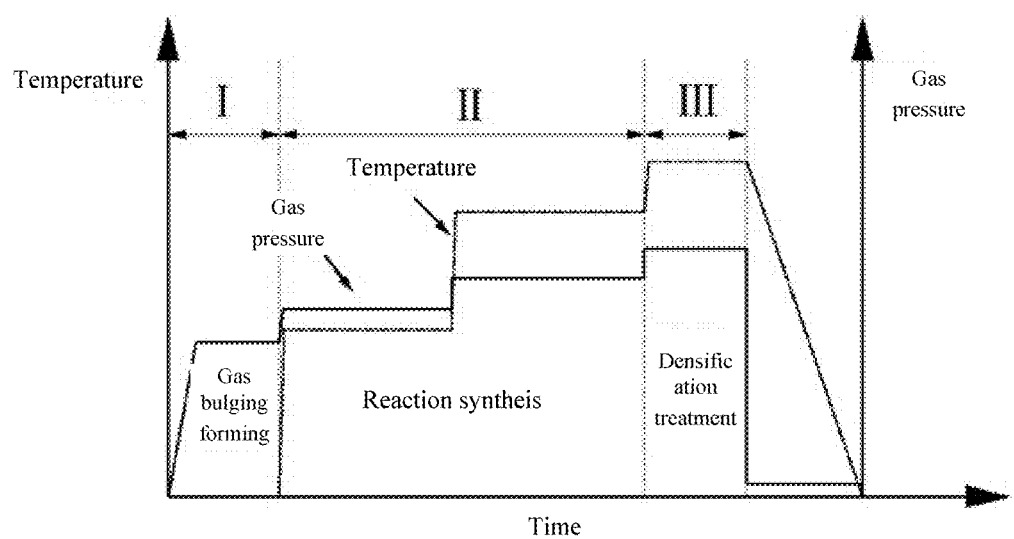
FIG. 2 is a schematic view showing changes in temperature and pressure with time during gas bulging forming, reaction synthesis and densification treatment according to the present invention.

In the present invention, a schematic view showing changes in temperature and pressure with time during gas bulging forming, reaction synthesis and densification treatment is as shown in FIG. 2.

Figure 3:
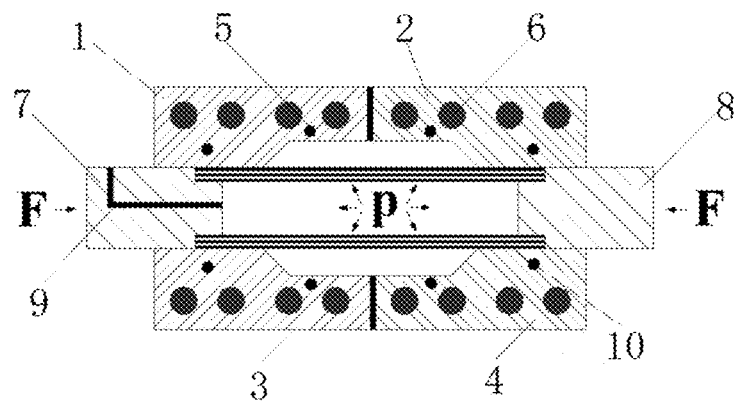
FIG. 3 is a schematic structural view of a gas bulging forming die according to the present invention, where a first upper die 1, a second lower die 2, a first lower die 3, a second lower die 4, a thermocouple 5, a heating element 6, a left punch 7, a right punch 8, a gas pressure tube 9, and a to-be-formed tubular part 10 are provided.

In the present invention, a schematic structural view of a gas bulging forming die is as shown in FIG. 3, and in FIG. 3, a first upper die 1, a second lower die 2, a first lower die 3, a second lower die 4, a thermocouple 5, a heating element 6, a left punch 7, a right punch 8, a gas pressure tube 9, and a to-be-formed tubular part 10 are provided. In the present invention, the upper die and the lower die in the gas bulging forming die are each composed of two parts, that is, the upper die is composed of the first upper die and second upper die; and the lower die is composed of the second lower die and second lower die. The die with the structure may realize partition heating and partition temperature control, which meets the synchronous regulation of structures and performances of various regions, thereby realizing the purpose of partition forming and control of large-scale complex thin-wall tubular parts.

The method for plastic forming of the Ni/Al laminated foil tube of the present invention adopts gas bulging forming, which may ensure the plastic formability of the Ni foil and the Al foil, improve the plastic forming rate of the Ni/Al laminated foil tube, and improve the forming rate of the final thin-walled tubular part. Through reasonable control of the reaction temperatures, gas pressures and time of the first reaction synthesis and the second reaction synthesis, Ni and Al fully react to form a thin-walled tubular part with uniform composition; finally, through reasonable control of the temperature, pressure and time of the densification treatment, the thin-walled member has fewer surface defects and excellent compactness. In addition, in the present invention, the plastic forming, reaction synthesis and densification treatment adopted for preparing the thin-walled tubular parts are all carried out in the gas bulging forming die, which can achieve synchronous regulation of microstructures and performances, such that large complex thin-walled tubular parts can be formed modularly with the performance thereof being controlled separately, and the process of first preparing tube blank and then performing plastic forming is avoided.

Figure 4:
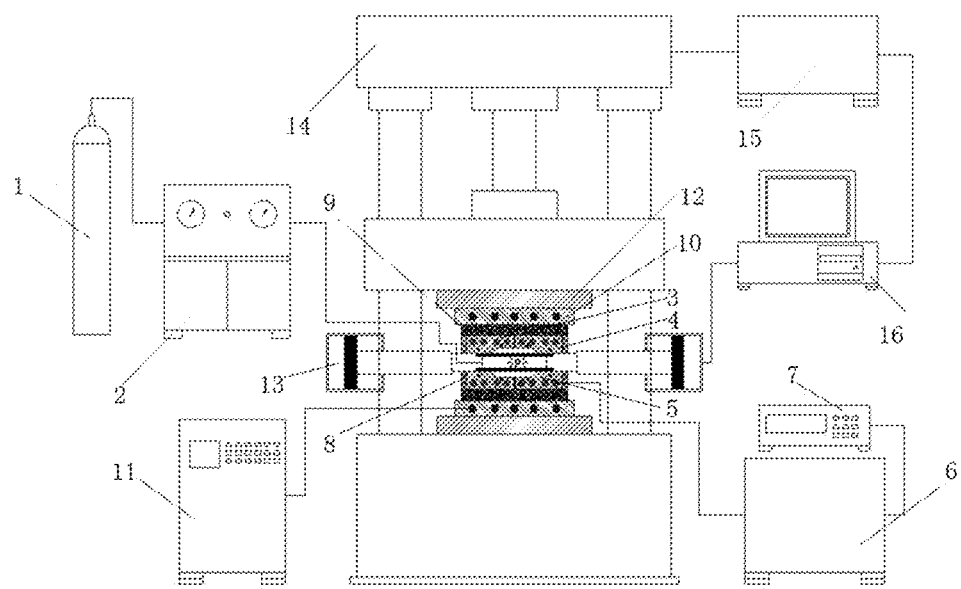
FIG. 4 is a device for preparing NiAl alloy thin-walled tubular parts according to the present invention, where a high-pressure gas source 1, a gas-filled control cabinet 2, a first upper die 3, a second upper die 4, a lower die 5, a heater 6, a temperature controller 7, a thermal insulation layer 8, a heat insulation plate 9, a water-cooled plate 10, an industrial chiller 11, a backing plate 12, a horizontal cylinder 13, a die assembly press 14, a hydraulic pump station 15 and a computer controller 16 are provided.

In the present invention, the device for preparing the NiAl alloy thin-walled tubular parts is as shown in FIG. 4. In FIG. 4, a high-pressure gas source 1, a gas-filled control cabinet 2, a first upper die 3, a second upper die 4, a lower die 5, a heater 6, a temperature controller 7, a thermal insulation layer 8, a heat insulation plate 9, a water-cooled plate 10, an industrial chiller 11, a backing plate 12, a horizontal cylinder 13, a die assembly press 14, a hydraulic pump station 15 and a computer controller 16 are provided.

In the present invention, the step of "performing gas bulging forming of the Ni/Al laminated foil tube, and after the Ni/Al laminated foil tube fully fits a gas bulging forming die, heating the gas bulging forming die to 610-650° C., . . . . , heating the gas bulging forming die to 1000-1300° C., raising the gas pressure to 50-100 MPa, maintaining the temperature and pressure for 1-5 h to perform densification treatment, and taking out a product to obtain the NiAl alloy thin-walled tubular parts" is preferably replaced by: performing gas bulging forming of the Ni/Al laminated foil tube, and after the Ni/Al laminated foil tube fully fits a gas bulging forming die, heating the gas bulging forming die to 610-650° C., raising the gas pressure to 10-20 MPa, maintaining the temperature and pressure for 2-5 h to perform first reaction synthesis; sequentially performing second reaction synthesis and densification treatment in a hot isostatic pressing device to obtain NiAl alloy thin-walled tubular parts; where the second reaction synthesis is to maintain the temperature and pressure for 2-5 h under an inert atmosphere at 1000-1300° C. and under the gas pressure of 10-50 MPa, and the densification treatment is to maintain the temperature and pressure for 1-5 h under an inert atmosphere at 1000-1300° C. and under the gas pressure of 50-100 MPa.

In the present invention, the conditions of the first reaction synthesis, the second reaction synthesis, and the densification treatment are the same as those of the first reaction synthesis, the second reaction synthesis, and the densification treatment which are sequentially performed in the gas bulging forming die, which will not be repeated here.

In the present invention, the hot isostatic pressing device is preferably a device in the prior art, which is commercially available, and the cost is not additionally increased; and at the same time, the hot isostatically treated thin-walled tubular part has high density, good uniformity, and excellent performance. At the same time, the hot isostatically treated thin-walled tubular part has a short production cycle, few processes, low energy consumption and low material loss.

The integrated method for forming and performance control of NiAl alloy thin-walled tubular parts provided by the present invention will be described in detail below with reference to the embodiments, which, however, cannot be understood as limiting the protection scope of the present invention.

Embodiment 1

An integrated method for forming and performance control of NiAl alloy thin-walled tubular parts includes the following steps:

(1) Calculate the ratio of Ni foil thickness to Al foil thickness according to the ratio of the number of Ni atoms to the number of Al atoms in a NiAl alloy; polish the Ni foils and the Al foils with fine sandpaper, place the Ni foils and the Al foils in an acetone solution for ultrasonic cleaning, soak the Ni foils and the Al foils in distilled water for 1 min, and take out the Ni foils and the Al foils and blow the Ni foils and the Al foils dry with cold air, to obtain pretreated Ni foils and pretreated Al foils; where the specific calculation process of the thickness ratio of the Ni foil to the Al foil is:

$N = n \times N_A$ (I); where N represents the number of atoms, n represents the amount of a substance, and $N_A$ represents the Avogadro's number;

$m = n \times M$ (II), where m represents mass, n represents the amount of the substance, and M represents the molar mass of the substance;

$h = m/(\rho \cdot S)$ (III), where h represents a height, m represents the mass, $\rho$ represents a density, and S represents across-sectional area;

it is also known: $\rho_{Ni} = 8.902$ g/cm$^3$; $M_{Ni} = 58.69$ g/mol; $\rho_{Al} = 2.70$ g/cm$^3$; $M_{Al} = 26.98$ g/mol;

from $N_{Ni}:N_{Al} = 1:1$, according to formulas (I), (II) and (III), it may be obtained: $h_{Ni}: h_{Al} = 1:1.5$.

(2) Alternately stack a plurality of the pretreated Ni foils and a plurality of the pretreated Al foils, to obtain a Ni/Al laminated foil; and coil the Ni/Al laminated foil to obtain a Ni/Al laminated foil tube.

(3) Place the Ni/Al laminated foil tube in the gas bulging forming die, perform gas bulging forming of the gas bulging forming die, and actually regulate the pressure required for the gas bulging forming according to forming conditions; after the Ni/Al laminated foil tube fully fits the gas bulging forming die, heat the gas bulging forming die to 610° C., raise the gas pressure to 10 MPa, and maintain the temperature and pressure for 5 h to perform first reaction synthesis; heat the gas bulging forming die to 1000° C., raise the gas pressure to 50 MPa, maintain the temperature and pressure for 4 h to perform second reaction synthesis; heat the gas bulging forming die to 1300° C., raise the gas pressure to 80 MPa, maintain the temperature and pressure for 1 h to perform densification treatment, and take out a product to obtain the NiAl alloy thin-walled tubular parts.

Figure 5:
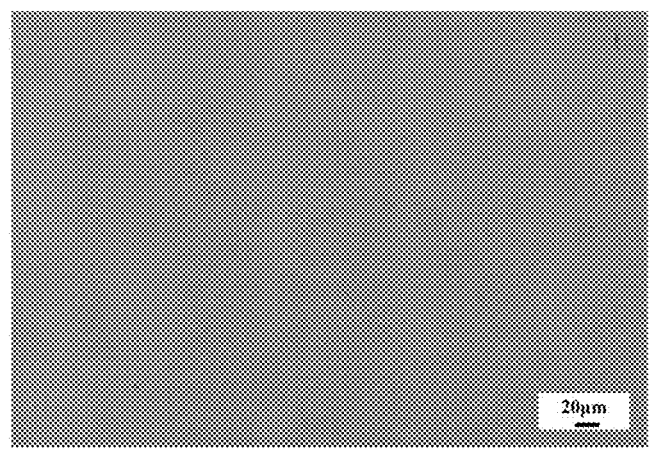
FIG. 5 is an SEM graph showing a cross section of a NiAl alloy thin-walled tubular part obtained in Embodiment 1.

FIG. 5 is an SEM graph showing a cross section of a NiAl alloy thin-walled tubular part obtained in Embodiment 1. As shown in FIG. 5, the composition in each area of the thin-walled tubular part is uniform, where the atomic ratio of Ni to Al is close to 1:1, specifically Ni:Al=49.6:59.4, and the surface is free from defects.

Embodiment 2

An integrated method for forming and performance control of NiAl alloy thin-walled tubular parts includes the following steps:

(1) the same as that of Embodiment 1.

(2) Alternately stack a plurality of the pretreated Ni foils and a plurality of the pretreated Al foils to obtain a Ni/Al laminated foil; coil the Ni/Al laminated foil, insert a metal shaft tube into the Ni/Al laminated foil tube, apply a boron nitride solder mask between the Ni/Al laminated foil tube and the metal shaft tube, integrally place the Ni/Al laminated foil tube and the metal shaft tube in a cylindrical cavity die for expansion, where the expansion temperature is 400° C., the gas pressure of the expansion is 20 MPa, and the expansion time is 0.5 h; and then integrally take out the Ni/Al laminated foil tube and the metal shaft tube to take out the internal metal shaft tube.

(3) Place the Ni/Al laminated foil tube in the gas bulging forming die, heat the gas bulging forming die to 400° C. and then perform gas bulging forming, and actually regulate the pressure required for the gas bulging forming according to forming conditions; after the Ni/Al laminated foil tube fully fits the gas bulging forming die, heat the gas bulging forming die to 640° C., raise the gas pressure to 20 MPa, and maintain the temperature and pressure for 3 h to perform first reaction synthesis; heat the gas bulging forming die to 1250° C., raise the gas pressure to 30 MPa, maintain the temperature and pressure for 3 h to perform second reaction synthesis; at 1300° C. and under the gas pressure of 100 MPa, maintain the temperature and pressure for 4 h to perform densification treatment, and take out a product to finally obtain the NiAl alloy thin-walled tubular parts.

The SEM graph of the NiAl alloy thin-walled tubular part obtained in this embodiment is similar to the graph of the cross section of the thin-walled tubular part in Embodiment 1.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. An integrated method for forming and performance control of NiAl alloy thin-walled tubular parts, comprising the following steps:
   (1) calculating the ratio of Ni foil thickness to Al foil thickness according to the ratio of the number of Ni atoms to the number of Al atoms in a NiAl alloy; and pretreating to-be-processed Ni foils and Al foils, to obtain pretreated Ni foils and pretreated Al foils;
   (2) alternately stacking a plurality of the pretreated Ni foils and a plurality of the pretreated Al foils, to obtain a Ni/Al laminated foil; and coiling the Ni/Al laminated foil to obtain a Ni/Al laminated foil tube; and
   (3) performing gas bulging forming of the Ni/Al laminated foil tube, and after the Ni/Al laminated foil tube fully fits a gas bulging forming die, sequentially performing first reaction synthesis, second reaction synthesis and densification treatment to obtain NiAl alloy thin-walled tubular parts; wherein the first reaction synthesis is to heat the gas bulging forming die to 610-650° C., raise the gas pressure to 10-20 MPa, and maintain the temperature and pressure for 2-5 h; the second reaction synthesis is to heat the gas bulging forming die to 1000-1300° C., raise the gas pressure to 10-50 MPa, and maintain the temperature and pressure for 2-4 h; and the densification treatment is to heat the gas bulging forming die to 1000-1300° C., raise the gas pressure to 50-100 MPa, and maintain the temperature and pressure for 1-5 h.

2. The integrated method for forming and performance control of NiAl alloy thin-walled tubular parts according to claim 1, wherein the temperature of the gas bulging forming and the gas pressure are actually regulated according to the gas bulging forming conditions.

3. The integrated method for forming and performance control of NiAl alloy thin-walled tubular parts according to claim 1 or 2, wherein the gas bulging forming is performed at 400-600° C.

4. The integrated method for forming and performance control of NiAl alloy thin-walled tubular parts according to claim 2, wherein the gas bulging forming is performed at room temperature.

5. The integrated method for forming and performance control of NiAl alloy thin-walled tubular parts according to claim 2, wherein the gas bulging forming is performed at 400-600° C.

6. The integrated method for forming and performance control of NiAl alloy thin-walled tubular parts according to claim 1, wherein after the Ni/Al laminated foil is coiled, the method further comprises welding a butt joint of the Ni/Al laminated foil.

7. The integrated method for forming and performance control of NiAl alloy thin-walled tubular parts according to claim 1, wherein after the Ni/Al laminated foil tube is obtained, the method further comprises inserting a metal shaft tube into the Ni/Al laminated foil tube, applying a boron nitride solder mask between the Ni/Al laminated foil tube and the metal shaft tube, integrally placing the Ni/Al laminated foil tube and the metal shaft tube in a cylindrical cavity die for expansion, integrally taking out the Ni/Al laminated foil tube and the metal shaft tube to take out the internal metal shaft tube, and executing step (3); wherein the expansion is performed at 300-500° C. under the gas pressure of 15-40 MPa for 0.1-5 h.

8. The integrated method for forming and performance control of NiAl alloy thin-walled tubular parts according to claim 1, wherein the gas bulging forming is performed at room temperature.

9. The integrated method for forming and performance control of NiAl alloy thin-walled tubular parts according to claim 1, wherein the working surface of the gas bulging forming die is evenly coated with the boron nitride solder mask.

10. The integrated method for forming and performance control of NiAl alloy thin-walled tubular parts according to claim 1, wherein gas for the gas bulging forming and gas for maintaining the gas pressure are each preferably an inert gas.

11. The integrated method for forming and performance control of NiAl alloy thin-walled tubular parts according to claim 1, wherein the gas pressure of the second reaction synthesis is lower than that of the densification treatment.

12. The integrated method for forming and performance control of NiAl alloy thin-walled tubular parts according to claim 1, wherein step (3) is replaced by: performing gas bulging forming of the Ni/Al laminated foil tube, and after the Ni/Al laminated foil tube fully fits a gas bulging forming die, heating the gas bulging forming die to 610-650° C., raising the gas pressure to 10-20 MPa, maintaining the temperature and pressure for 2-5 h to perform first reaction synthesis; sequentially performing second reaction synthesis and densification treatment in a hot isostatic pressing device to obtain NiAl alloy thin-walled tubular parts; wherein the second reaction synthesis is to maintain the temperature and pressure for 2-5 h under an inert atmosphere at 1000-1300° C. and under the gas pressure of 10-50 MPa, and the densification treatment is to maintain the temperature and pressure for 1-5 h under an inert atmosphere at 1000-1300° C. and under the gas pressure of 50-100 MPa.

* * * * *